US012805497B2

(12) United States Patent
McGeachie

(10) Patent No.: US 12,805,497 B2
(45) Date of Patent: Nov. 24, 2026

(54) FISHING LURE WITH REPLACEABLE LIMBS

(71) Applicant: Heath McGeachie, Peakhurst (AU)

(72) Inventor: Heath McGeachie, Peakhurst (AU)

(*) Notice: Subject to any disclaimer, the term of this patent is extended or adjusted under 35 U.S.C. 154(b) by 0 days.

(21) Appl. No.: 19/148,661

(22) PCT Filed: Apr. 16, 2024

(86) PCT No.: PCT/AU2024/050358
§ 371 (c)(1),
(2) Date: Jul. 16, 2025

(87) PCT Pub. No.: WO2024/216328
PCT Pub. Date: Oct. 24, 2024

(65) Prior Publication Data

US 2026/0215403 A1 Jul. 30, 2026

(30) Foreign Application Priority Data

Apr. 20, 2023 (AU) ................................ 2023901173

(51) Int. Cl.
*A01K 85/00* (2006.01)

(52) U.S. Cl.
CPC ........ *A01K 85/029* (2022.02); *A01K 85/1813* (2022.02)

(58) Field of Classification Search
CPC .... A01K 85/00; A01K 85/005; A01K 85/011; A01K 85/012; A01K 85/013; A01K 85/019; A01K 85/02; A01K 85/023; A01K 85/024; A01K 85/025; A01K 85/026; A01K 85/027; A01K 85/028; A01K 85/029; A01K 85/16; A01K 85/18; A01K 85/1803; A01K 85/1807; A01K 85/1811; A01K 85/1813;
(Continued)

(56) References Cited

U.S. PATENT DOCUMENTS 2,244,032 A * 6/1941 Timm .................... A01K 85/18
43/42.47
2,516,133 A 7/1950 Martin
(Continued)

FOREIGN PATENT DOCUMENTS

CN 205727722 U 11/2016
JP 2021007378 A 1/2021
(Continued)

OTHER PUBLICATIONS

English translation of KR 20180002863 U (Year: 2018).*
English translation of KR 20190030272 A (Year: 2019).*

*Primary Examiner* — Peter M Poon
*Assistant Examiner* — Danielle A Clerkley
(74) *Attorney, Agent, or Firm* — INNOVATION CAPITAL LAW GROUP, LLP; Vic Lin

(57) ABSTRACT

The disclosure pertains to a fishing lure comprising a body and a detachable limb assembly which mimics the natural movement of prey to attract predatory fish. The limb assembly is connected to the body via a uniquely designed connector hub that fits securely within a coupling bay in the body, held in place by a releasable retention pin that extends across the bay for easy attachment and detachment. This configuration facilitates the replacement of worn or damaged limbs, thereby extending the lifespan of the lure.

18 Claims, 3 Drawing Sheets

(58) Field of Classification Search
CPC ............ A01K 85/1817; A01K 85/1821; A01K 85/1823; A01K 85/1827; A01K 85/1831; A01K 85/1833; A01K 85/1837; A01K 85/1841; A01K 85/1843; A01K 85/1847; A01K 85/1851; A01K 85/1853; A01K 85/1857; A01K 85/1861; A01K 85/1863; A01K 85/1867; A01K 85/1871; A01K 85/1873; A01K 85/1877; A01K 85/1881; A01K 85/1883; A01K 85/1887; A01K 85/1891; A01K 85/1893; A01K 85/1897
See application file for complete search history.

(56) References Cited

U.S. PATENT DOCUMENTS

| | | | | |
|---|---|---|---|---|
| 6,050,022 | A | 4/2000 | Brick | |
| 6,546,663 | B1 * | 4/2003 | Signitzer | A01K 85/00 43/4.5 |
| 8,429,847 | B2 * | 4/2013 | Ford | A01K 85/16 43/42.22 |
| 9,474,257 | B1 | 10/2016 | McGilvry | |
| 2001/0032411 | A1 * | 10/2001 | Spence | A01K 85/00 43/42.24 |
| 2010/0011651 | A1 * | 1/2010 | Rapelje | A01K 85/18 43/4.5 |
| 2020/0352148 | A1 | 11/2020 | Mancini | |
| 2023/0055970 | A1 | 2/2023 | Kertz | |

FOREIGN PATENT DOCUMENTS

| | | | | | |
|---|---|---|---|---|---|
| JP | 2022129134 | A | | 9/2022 | |
| KR | 20180002863 | U | * | 10/2018 | A01K 85/08 |
| KR | 20190030272 | A | * | 3/2019 | A01K 85/00 |
| SE | 157563 | C1 | | 1/1957 | |
| WO | 2014026241 | A1 | | 2/2014 | |

* cited by examiner

FISHING LURE WITH REPLACEABLE LIMBS

FIELD OF THE INVENTION

This invention relates generally to a type of modular fishing lure having replaceable limbs.

BACKGROUND OF THE INVENTION

A fishing lure is a type of artificial fishing bait designed to attract the attention of fish, enticing them to bite or strike. Lures are crafted to mimic the appearance, movement, and sometimes even the sound of prey, such as smaller fish, insects, or other natural food sources for fish. They are made from a variety of materials, including plastic, metal, wood, and rubber, and come in an array of shapes, sizes, and colours. Lures are equipped with one or more hooks that are used to catch fish when they bite onto the lure. They are an essential tool for anglers, offering an alternative to live bait and are used in both freshwater and saltwater fishing.

Within the broad category of fishing lures, modular fishing lures represent a specialised segment designed for customization and adaptability. These lures have interchangeable parts, allowing anglers to modify their configuration, action, or appearance to suit specific fishing conditions, target species, or personal preferences.

The modular design also offers the practical advantage of replacing worn or damaged components without the need to discard the entire lure. This can include swapping out hooks, changing skirt colours, adjusting weights, or altering other parts of the lure to achieve the desired performance and appeal. For example, JP 2021007378 A (Kazuaki et al.) 28 Jan. 2021 discloses a fishing lure in the form of an insect with modular components that can be exchanged or repaired if broken, including a platelike dorsal blade holder used to clamp a quadrant of wings/blades.

These modular fishing lures provide a versatile and cost-effective solution for anglers who want to tailor their fishing strategy to varying conditions and preferences, enhancing their chances of a successful catch.

It is to be understood that, if any prior art information is referred to herein, such reference does not constitute an admission that the information forms part of the common general knowledge in the art, in Australia or any other country.

SUMMARY OF THE DISCLOSURE

The disclosed fishing lure embodiment comprises a body with a specifically designed coupling bay and a detachable limb assembly featuring a connector hub from which multiple limbs extend.

This design allows for the connector hub to be securely fitted within the coupling bay using a simple and reliable connector in the form of a releasable retention pin which extends across the bay to engage hub, thereby ensuring the limb assembly's secure attachment to the body.

The body of the lure may be crafted from a durable thermoplastic polymer, such as Acrylonitrile Butadiene Styrene, ensuring longevity and resistance to environmental factors. In contrast, the limb assembly may be made from a softer flexible, rubbery material like silicon, which allows for a realistic, biomimetic movement appealing to predatory species.

However, wear or damage to the limbs on account of their less durable nature can be addressed by the easy replacement of the entire soft limb assembly. This material dichotomy ensures that while the lure maintains a high degree of functionality and appeal, its most frequently worn parts can be replaced without discarding the entire lure, significantly extending its usable life.

Moreover, the connector hub and retention pin mechanism enhances the lure's functionality by allowing for a secure yet easily reversible connection between the body and the limb assembly. This design simplifies the process of replacing damaged limbs, making it a straightforward task that does not require specialised tools or skills. The connector hub, providing a platform to accommodate limbs in various positions and orientations, further contributes to the lure's versatility and effectiveness by supporting a range of lifelike movements.

Unlike previous designs where modularity might compromise structural integrity or require multiple fasteners, this fishing lure achieves a secure attachment with minimal movement tolerance using a single retention pin.

This approach not only streamlines assembly and maintenance but also improves the overall performance of the lure, offering anglers a more effective, durable, and environmentally friendly option.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
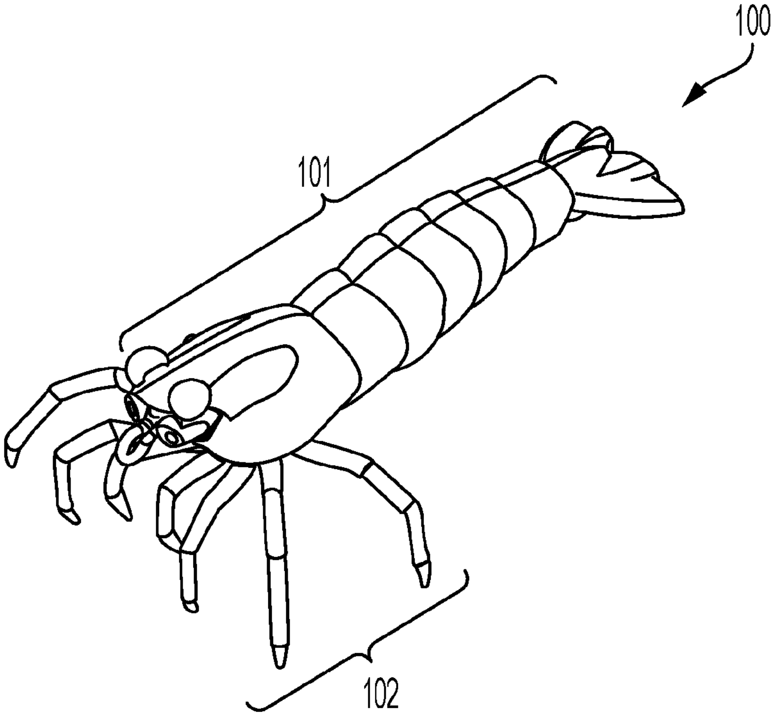
FIG. 1 shows a perspective view of a fishing lure in accordance with an embodiment.

A fishing lure 100 comprises a body 101 defining a coupling bay 109 and a separate detachable limb assembly 102 comprising a connector hub 110 from which a plurality of limbs 104 extend. In the embodiment shown, the limbs 104 mimic legs, but may mimic pincers or other appendages including antennae, fins, wings, and pincers in alternative embodiments.

The connector hub 110 is configured to fit within the coupling bay 109 and the lure 100 further comprises a releasable retention pin 103 which is configured to extend across the coupling bay 109 to engage the connector hub 110 to secure the connector hub 110 within the coupling bay 109. In embodiments shown, the retention pin 103 is secured at both sides of the coupling bay 109 to transversely engage the connector hub 110.

The body 101 may comprise a more durable material than the limb assembly 101, such as a thermoplastic polymer which may be Acrylonitrile Butadiene Styrene. The limb assembly 102 may comprise softer rubbery material, such as silicon. The rubbery nature of the limb assembly 102 allows the limbs 104 to wiggle and twitch, enhancing the biomimicry appeal of the lure 100 to predatory species.

Whereas the softer material of the limb assembly 102 may be less durable than the material of the body 101 (potentially resulting in loss of one or more limbs 104), the entire limb assembly 102 can be periodically replaced easily whilst the more durable body 101 is continuously reused.

The connector hub 110 allows for the easy and secure attachment of the limbs 104 from the body 101 using a simple and reliable connector in the form of the retention pin 103 which extends transversely (i.e. across) the coupling bay 109 to engage the connector hub 110 therein.

Replacement of damaged limbs 104 may comprise releasing the retention pin 103 to disengage the connector hub 109 from the coupling bay 110 whereafter a connector hub 110 of a new limb assembly 102 can be inserted into the coupling bay 110 and secured using the retention pin 103.

The connector hub 110 provides a relatively large platform from which a plurality of limbs 104 can extend from various positions and orientations for enhanced biomimicry. The connector hub 110 further provides a monobloc which can be engaged securely within the coupling bay 109 with little or no movement tolerance and which can be secured using a single retention pin 103.

Preferably, the limb assembly 103 is monolithic wherein the connector hub 110 and the plurality of limbs 104 are integrally formed as one piece. The limb assembly 102 may be integrally formed using an injection moulding any factor process.

Figure 6:
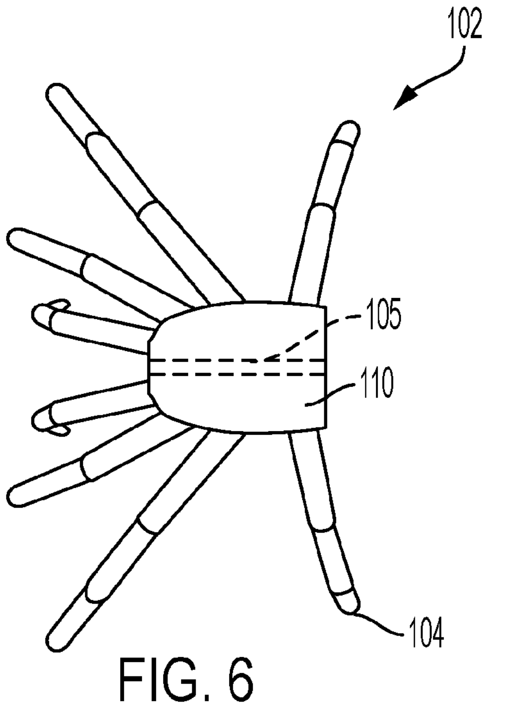
FIG. 6 shows a top view of the limb assembly of FIG. 5.

With reference to FIG. 6, the connector hub 110 may define an engagement channel 105 through which the retention pin 103 extends across the coupling bay 109. According to this configuration, a free end 119 of the retention pin 103 may slide into the engagement channel 105 to engage the connector hub 110.

According to the preferred embodiment shown, the retention pin 103 is substantially aligned with respect to a longitudinal axis 118 of the body 101 when engaging the connector hub 110. According to the embodiment shown, the lure 100 is shaped to mimic a shrimp wherein it comprises an elongate body 101 and wherein the retention pin 103 is substantially aligned along the longitudinal axis 118 thereof (i.e., orientated anteroposteriorly) when engaging the connector hub 110.

Figure 3:
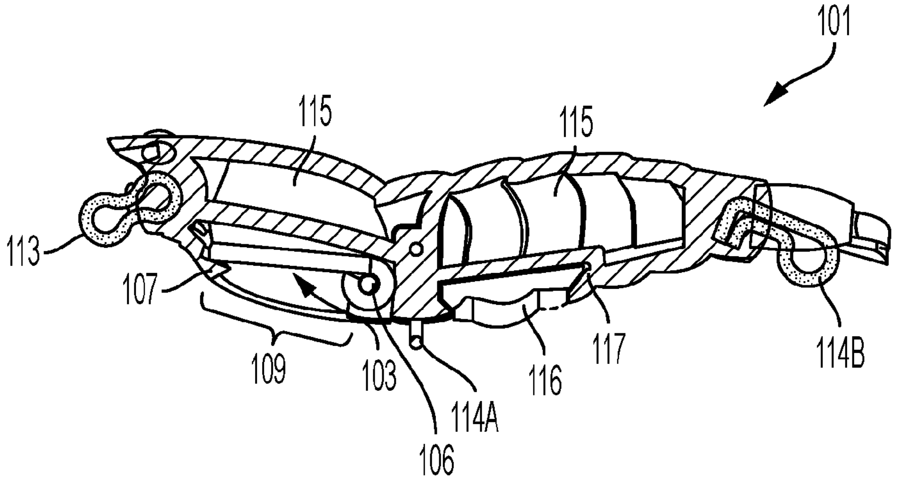
Figure 4:
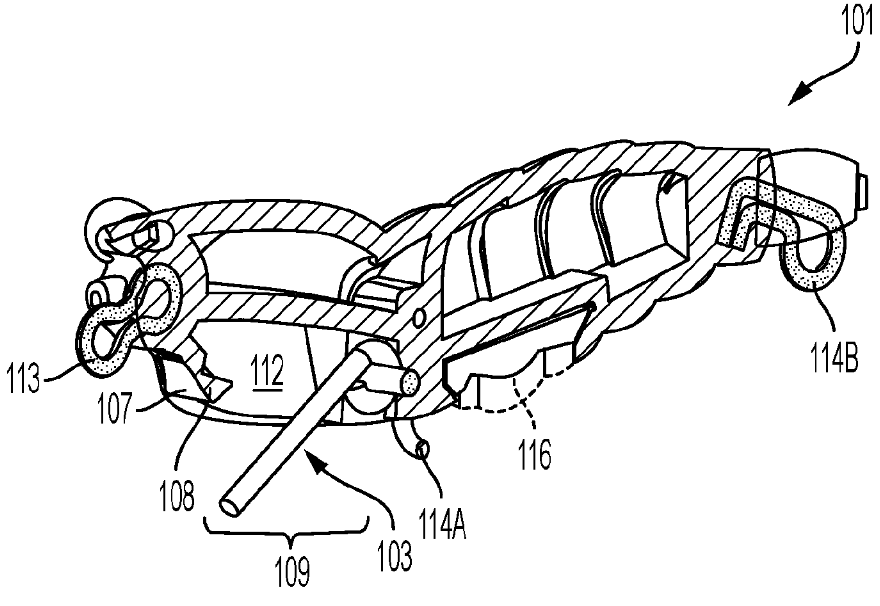
FIG. 4 shows a side perspective internal view of the lure.
Figure 5:
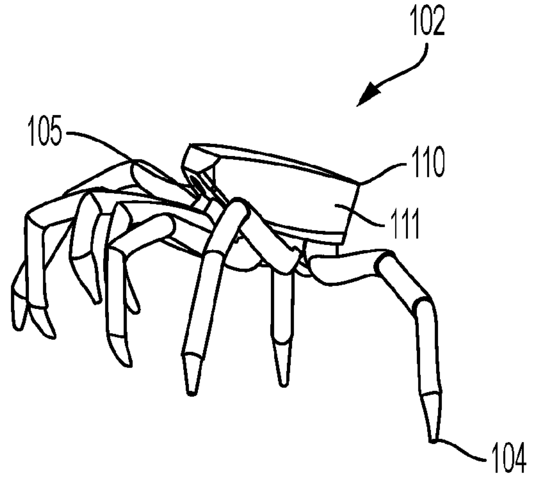
FIG. 5 shows a side perspective view of a limb assembly of the fishing lure.

According to the preferred embodiment shown in FIGS. 3 and 4, the retention pin 103 is permanently attached at one end thereof to the body 101 and which therefore defines the free end 119. More specifically, the retention pin 103 may be pivotally coupled to the body 101. In the specific embodiment shown, an attached end of the retention pin 103 may define a coil 120 which swivels around a peg 121.

The body 101 may define a catch 107 configured to engage the free end 119 of the retention pin 103. The catch 107 may be located to one side so that the free end 119 of the retention pin 103 can be disengaged from the catch 107 by sideways movement wherein the free end 109 can pivot past a side 108 of the catch 107.

Preferably the retention pin 103 is accommodated entirely within the coupling bay 109 when engaging the connector hub 110.

According to the embodiments shown, the coupling bay 109 is ventrally located so that the limb assembly 102 can be attached from underneath the body 101 having the limbs 10 for extending from underneath the body 101. Further preferably, the body 101 is elongate and wherein the connector hub 109 is anteriorly located (i.e., towards the front of the body 101).

Figure 7:
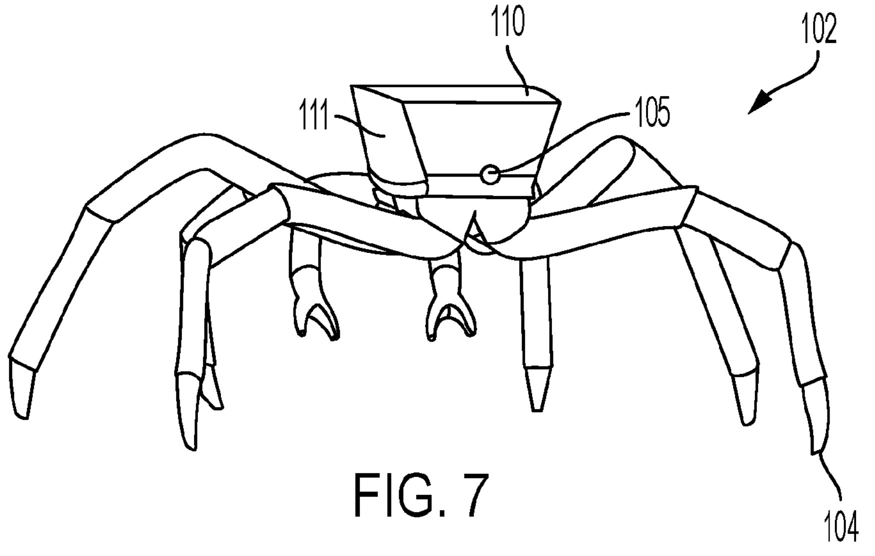
FIG. 7 shows a front perspective view of the limb assembly of FIG. 5.

In a preferred embodiment, the connector hub 110 and the coupling bay 109 define profiles which are configured to mechanically interlock with each other. This mechanical interlock may complement the fastening provided by the retention pin 103 and which may reduce or eliminate movement tolerance of the limb assembly 102 with respect to the body 101. As is evident from FIG. 7, sides 111 of the connector hub 110 may be oppositely angled with respect to interior sidewalls 112 of the coupling bay 109 to thereby form a dovetail-type interlock. In the embodiment wherein the limb assembly 102 comprises a soft rubbery material, the connector hub 110 can be squeezed through the relatively confined opening of the coupling bay 109 whereafter it expands to form the dovetail type interlock.

Figure 2:
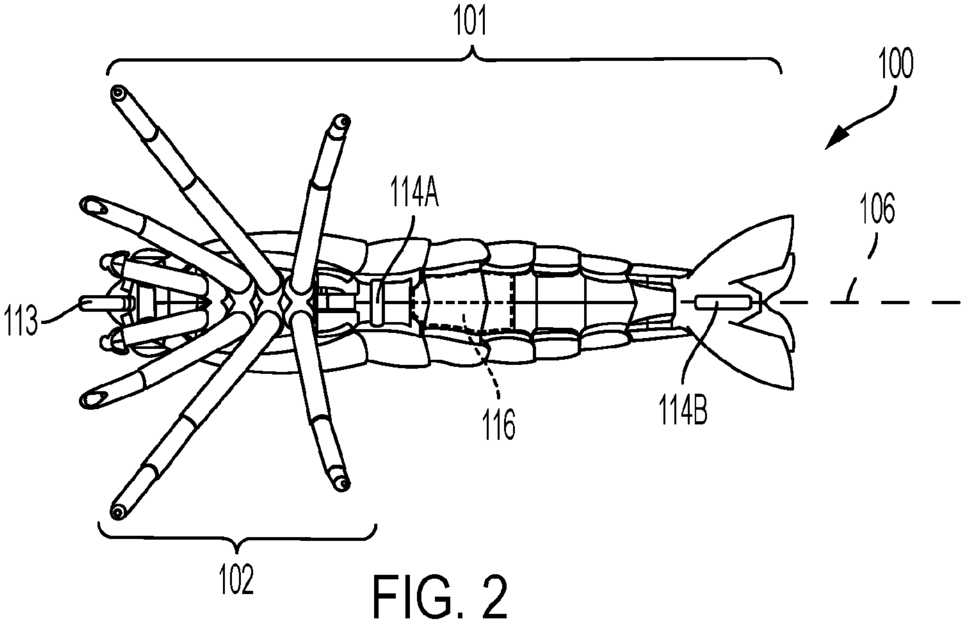
FIG. 2 shows an underside view of the fishing lure to FIG. 3 shows a side internal view of the fishing lure.

In embodiment shown, the lure 100 is shaped to mimic a crustacean wherein the limb assembly 102 comprises at least four limbs extending from each side thereof. As is evident from FIG. 2, some of these limbs 104 may extend backwards and others forwards.

With reference to FIG. 1, the body 101 may define a cephalothorax portion 101A and an abdomen portion 101B and wherein the coupling bay 109 is defined by the cephalothorax portion 101A.

With reference to FIG. 3, the body 101 may define a line eyelet 113 and a hook eyelet 114. The coupling bay 109 may be between the line eyelet 113 and the hook eyelet 114. As is further shown in FIG. 3, the body 101 may support a midsection hook eyelet 114A and a distal end hook eyelet 114B.

The body 101 may define internal buoyancy chambers 115. In embodiments, the body 101 may engage a weighted portion 116 which may be attached to control the buoyancy of the lure 100. As is shown a FIG. 4, the weighted portion 116 may engage a weighted portion coupling bay 117 using a mechanical interlock such as a dovetail interlock.

The body 101 may comprise bifurcated portions 101C which are longitudinally bisected (further preferably bisected by a vertical plane) and which connect together to form the body 101. When disconnected, the retention pin 103 can easily be engaged by the peg 121 extending from one of the portions 101C whereafter the portions 101C are connected together to enclose the retention pin 103.

When using the lure 100 according to the preferred embodiment shown, if any of the limbs 104 become word or damaged, the entire limb assembly 102 can be replaced by pushing the free end 119 of the retention pin 103 sideways to disengage it from the catch 107 and allow it to pivot past the side 108 of the catch 107 out of the coupling bay 109 as is shown in FIG. 4. The damage limb assembly 102 can then be pulled off the retention pin 103.

The retention pin 103 can then be inserted into the engagement channel 105 of a replacement limb assembly 102 whereafter the connector hub 110 of the replacement limb assembly 102 is pushed up into the coupling bay 109. The soft nature of the limb assembly 102 allows the dovetail cross-section of the connector hub 110 to squeeze into the coupling bay 103. The free end 119 of the retention pin 103 can then be pushed sideways to engage the interior catch 107.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A fishing lure comprising a body defining a coupling bay and a detachable limb assembly comprising a connector hub from which a plurality of limbs extend, wherein the connector hub is configured to fit within the coupling bay, wherein the connector hub defines an engagement channel, wherein the connector hub and the coupling bay define complementary dovetail profiles configured to form a mechanical interlock with each other when the connector hub is received in the coupling bay, wherein the limb assembly comprises a soft rubbery material such that the connector hub is compressible through a relatively confined opening of the coupling bay and expandable within the coupling bay to form the mechanical interlock, wherein a releasable retention pin is configured to extend through the engagement channel and across the coupling bay to secure the connector hub within the coupling bay, wherein the retention pin comprises an attached end defining a coil which swivels around a peg of the body such that the retention pin is permanently attached to the body, wherein the retention pin has a free end opposite the attached end and is pivotable between a retaining position in which the retention pin extends through the engagement channel and a released position in which the retention pin is pivoted out of the coupling bay, wherein the coupling bay defines a catch configured to engage the free end of the retention pin in the retaining position, and wherein the catch is laterally offset relative to a pivot path of the retention pin such that sideways movement of the free end moves the free end clear of the catch to allow the retention pin to pivot from the retaining position to the released position.

2. The fishing lure as claimed in claim 1, wherein the limb assembly is monolithic wherein the connector hub and the plurality of limbs are integrally formed as one piece.

3. The fishing lure as claimed in claim 1, wherein the body has a more rigid material than the limb assembly.

4. The fishing lure as claimed in claim 1, wherein the retention pin is aligned with respect to a longitudinal axis of the body when engaging the connector hub.

5. The fishing lure as claimed in claim 1, wherein the retention pin is accommodated entirely within the coupling bay when engaging the connector hub.

6. The fishing lure as claimed in claim 1, wherein the coupling bay is ventrally located.

7. The fishing lure as claimed in claim 1, wherein the coupling bay is anteriorly located.

8. The fishing lure as claimed in claim 1, wherein more than one limb extends from each side of the connector hub.

9. The fishing lure as claimed in claim 1, wherein the body comprises a material that is harder than that of the limb assembly.

10. The fishing lure as claimed in claim 9, wherein the body comprises a thermoplastic polymer.

11. The fishing lure as claimed in claim 10, wherein the thermoplastic polymer comprises acrylonitrile butadiene styrene.

12. The fishing lure as claimed in claim 9, wherein the limb assembly is rubbery.

13. The fishing lure as claimed in claim 1, wherein the fishing lure is shaped as a crustacean and wherein the limb assembly comprises at least four limbs extending from each side of the connector hub.

14. The fishing lure as claimed in claim 13, wherein the fishing lure is shaped as a crustacean defining cephalothorax and abdomen portions and wherein the coupling bay is defined by the cephalothorax portion.

15. The fishing lure as claimed in claim 1, wherein the body defines internal buoyancy chambers.

16. The fishing lure as claimed in claim 1, wherein the body engages a weighted portion.

17. The fishing lure as claimed in claim 16, wherein the body defines a weighted portion coupling bay having a profile which mechanically engages a profile of the weighted portion.

18. The fishing lure as claimed in claim 1, wherein the body comprises bifurcated portions which define the coupling bay therebetween.

* * * * *